Feb. 15, 1966 W. D. VOELKER 3,235,400
METERING FOAM COATING
Filed March 22, 1961 4 Sheets-Sheet 1

INVENTOR.
Walter D. Voelker
BY John R. Eubank
ATTORNEY.

Feb. 15, 1966 W. D. VOELKER 3,235,400
METERING FOAM COATING
Filed March 22, 1961 4 Sheets-Sheet 2

INVENTOR.
Walter D. Voelker
BY John R. Eubank
ATTORNEY.

INVENTOR.
Walter D. Voelker
BY John R. Ewbank
ATTORNEY.

Feb. 15, 1966 W. D. VOELKER 3,235,400
METERING FOAM COATING
Filed March 22, 1961 4 Sheets-Sheet 4

INVENTOR.
Walter D. Voelker
BY
John R. Eubank
ATTORNEY.

United States Patent Office 3,235,400
Patented Feb. 15, 1966

3,235,400
METERING FOAM COATING
Walter D. Voelker, Philadelphia, Pa., assignor to Union Carbide Corporation, New York, N.Y., a corporation of New York
Filed Mar. 22, 1961, Ser. No. 97,650
1 Claim. (Cl. 117—102)

This invention relates to production lines for the substantially continuous manufacture of strips of plastic foam structures and particularly to metering devices for controlling the thickness of the foam.

Methods and apparatus have long been used for applying continuously to sheet materials a suitable coating material of a controlled thickness. Various modifications of doctor blades have proven to be very satisfactory for many varieties of coatings. However, the excess material removed by a doctor blade may have a chemical composition such that it undergoes reactions and transformations if not promptly applied to the sheet material and processed according to the intended schedule. Foam forming chemicals such as employed in manufacturing epoxy foams, polyurethane foams, and the like, are particularly susceptible to adverse transformations if not processed in accordance with a predetermined schedule. Moreover, pre-foamed plastic coatings are sensitive to schedules which must be timed very precisely, thus creating unusual problems affecting the control of metered coatings of precisely regulated thickness. Foam forming chemicals expand to a thickness approximately thirty times the initial thickness, thus necessitating a precision and uniformity of a different order of magnitude than required in some conventional coatings. Accordingly, the technology affecting the metering and control of coating thickness of foaming compositions (a generic term embracing both foam-forming chemicals which are precursors of plastic foams and pre-foamed plastic) has become a technology significantly different from the technology of applying conventional coatings. It has been customary to make thin polyurethane foam components by slitting thick polyurethane foam members because it appeared impossible to achieve the necessary precision for metering thin films of the chemical mixtures from which polyurethane foams are produced.

In accordance with the present invention, plastic foam of controlled thickness is combined with sheet material continuously by metering the composition in such a manner that any excess removed in the thickness regulating operation is promptly utilized for coating subsequent portions of the continuously advancing sheet material, whereby significant amounts of stale coating material cannot accumulate.

The invention is further clarified by reference to the accompanying drawings, in which FIGURE 1 is a schematic view of a metering system in which an advancing sheet of material is coated with a metered amount of foam-forming or pre-foamed materials and the thickness is regulated by the combination of metering rolls and the backward wiping of a portion of the advancing sheet which has not previously been given its principal coating.

FIGURE 6 is a sectional view and FIGURE 7 is a perspective view of a dispenser.

FIGURE 9 is a partially cut-away view of the dispenser of the apparatus of FIGURE 8, which is a sectional view.

Figure 1:
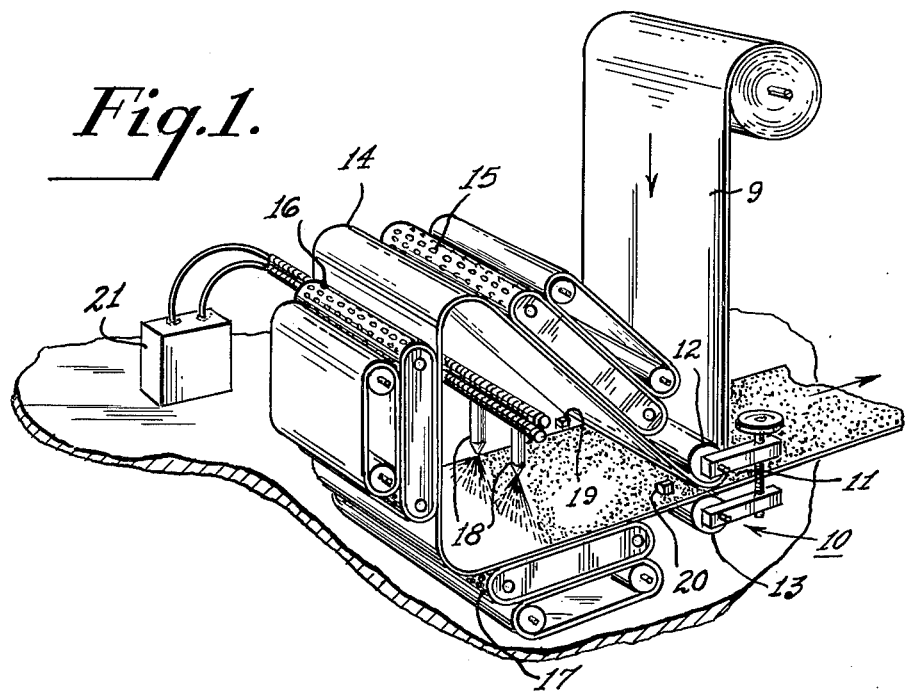

As shown in FIGURE 1 a sheet material 9 may be directed through a metering zone 10 comprising a metering gap 11 between metering rolls 12 and 13. The adjustments between the metering rolls 12 and 13 can be precisely varied to accommodate the desired thickness of coating with suitable allowance for the thickness of the sheet material 9. The sheet material advances from metering roll 12 through a loop 14 and is maintained in the loop by contact with three vacuum belts 15, 16 and 17. The sheet material 9, just prior to passing over metering roll 13 is coated with foam forming chemicals from one or more mixing heads 18 and the thus coated sheet material advances through the precisely regulated space between the portions of the sheet material contacting the metering rolls 12 and 13. Any excess material from the metering heads 18 which cannot pass through the confined space regulated by the metering rolls is drawn backwardly by the wiping action of the sheet material passing under the metering roll 12. Automatic regulating means such as a light beam 19 and photo cell 20 on opposite sides of the advancing sheet material immediately behind the metering rolls is associated with controlling means 21 for regulating the supply of materials to the mixing head 18 to maintain the predetermined amount of coating material immediately behind the gap between the metering rolls 12 and 13.

In the operation of the method of FIGURE 1 the sheet material 9 is coated by the foam forming chemicals supplied by the mixing head 18 and advances through the metering gap 11 between the metering rolls 12 and 13 so that the sheet material advancing from the metering roll 13 consistently has a predetermined thickness of coating material. The supply of foam-forming chemicals to the metering head 18 is controlled by a regulator 21 which is actuated when necessary by a signal from the light and photo cell 19 and 20, whereby only a sufficient amount of coating material is maintained immediately behind the gap between metering rolls 12 and 13. An alternate method of maintaining the desired amount of coating material behind the metering rolls 12 and 13 is to vary the forward speed of the paper 9 in accordance with the signal from the light and photo cell 19 and 20 while maintaining a uniform rate of application of the coating chemicals from the mixing head 18. It should be especially noted that the wiping action of the sheet material 9 passing under the metering roll 12 and the automatic regulation of the amount of coating material behind the metering rolls 12 and 13 effectively prevents the accumulation of stale coating material in the coating zone.

Figure 3:
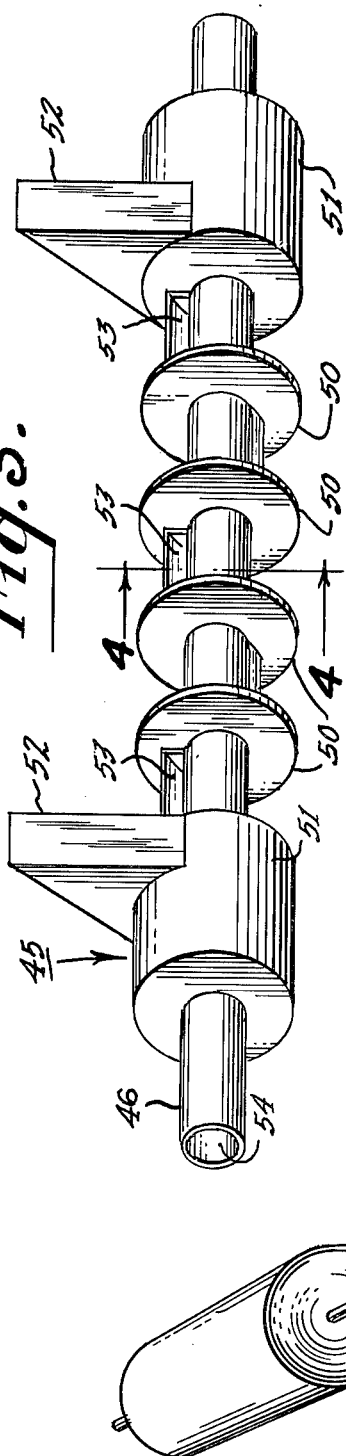
FIGURE 3 is a perspective view of the dispenser of FIGURE 2.
Figure 4:
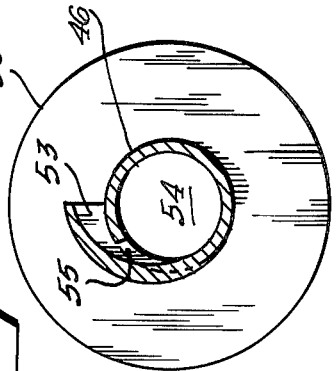
FIGURE 4 is a sectional view of the dispenser, taken on the line 4—4 of FIGURE 3.
Figure 2:
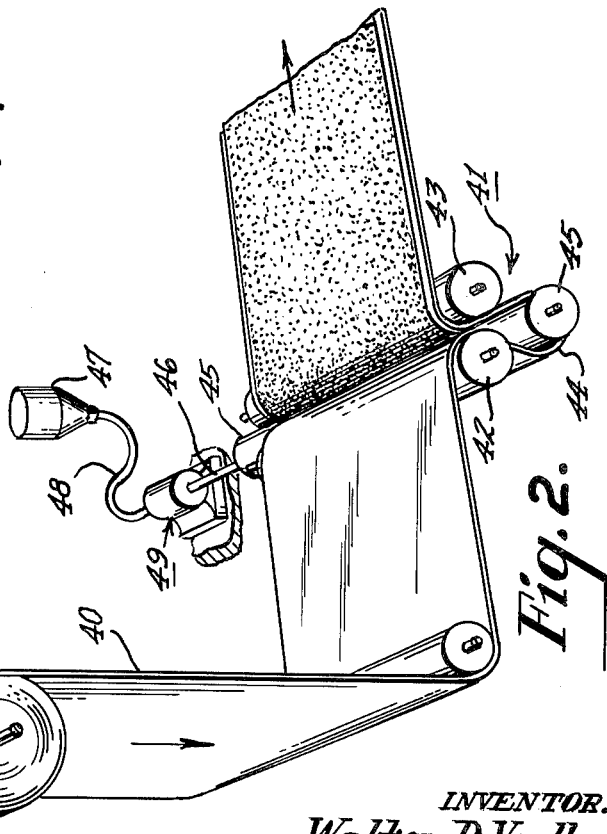
FIGURE 2 is a schematic view of apparatus in which an advancing sheet passes as a loop about a dispenser, whereby the metering rolls function effectively to prevent the accumulation of excess coating material.
Figure 5:
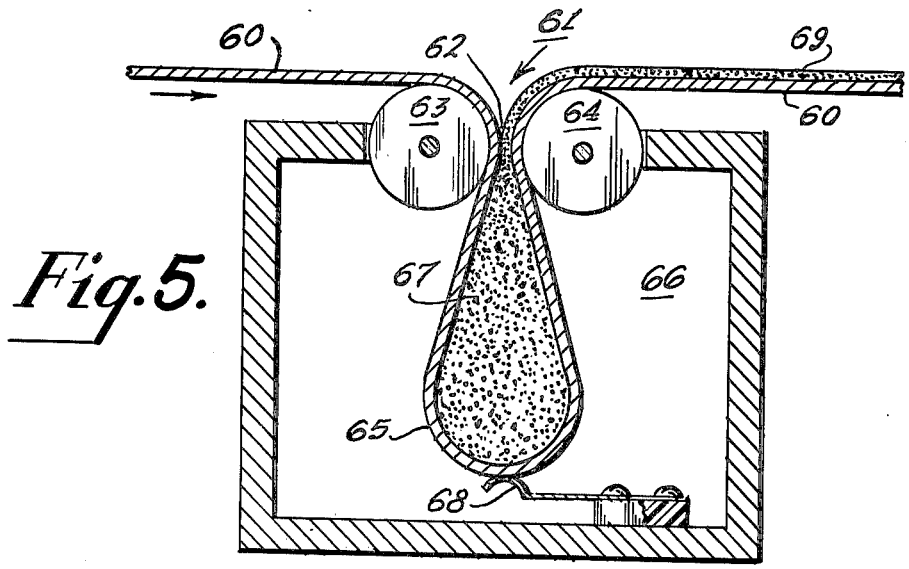
FIGURE 5 is a sectional view of a first modification of the apparatus of FIGURE 2.

In FIGURES 2, 3, and 4 an advancing sheet passes through a metering zone 41 comprising adjustable metering rolls 42 and 43 and a loop 44. A dispenser 45 feeds the coating material at a controlled rate into the metering gap between the two portions of the sheet material passing over the metering rolls 42 and 43. As shown in FIGURE 4 the dispenser 45 includes a central tube 46 through which the coating material is supplied. A mixing head 47 directs the coating material through a tube 48 and through a pressure sensing device 49 (which may comprise a rotating seal) to the central tube 46. The loop 44 of sheet material fits against the discs 50 and cylinders 51. The sheet material also has sliding contact with end closure members 52 so that the loop 44 encloses a zone which can be substantially filled with the coating material. As shown in FIGURE 5 the discharge port 53 may be connected with a central supply line 54 in the tube 46 through an opening 55. The discharge ports 53 of the dispenser 45 are shaped so that a spiral flow is imparted to the coating material and the movement of the sheet material further promotes such spiral flow. The applicator 45 may be rotating with only the end members 52 remaining in fixed position, or the applicator 45 may be stationary.

In the operation of the method of FIGURES 3, 4, and 5 the coating composition from mixing head 47 flows through the central opening 54 of the tube 46 and is discharged tangentially through ports 53 into a zone within the loop 44. Inasmuch as the sheet material 40 is advancing around the loop 44 and is helping to draw the coating composition from its tangential discharge 53 through the gap between the metering rolls, there is no possibility for stale coating composition to accumulate in the applicator 45.

The end members 52 desirably may be constructed of or coated with polytetrafluoroethylene or other material having excellent releasing characteristics for the coating composition. Certain advantages can be obtained by coating all portions of the applicator 45 with materials effective as release surfaces for the coating composition employed. The discs 50 are relatively thin and the discharge ports 53 may be positioned with half of such discharge ports 180° from the position of the other half of the discharge ports, whereby the dynamic balance of the applicator is improved. The rotation of the applicator is optional, and although certain advantages are derived by rotating at the same peripheral speed as the sheet material, the rotation may be at another speed. Although the drawings show a vertical metering axis passing through the gap between the metering rolls and the central supply line 54, such metering axis may be positioned horizontally or at an angle. If the metering axis is horizontal, a controlled amount of coating material should be maintained immediately behind the gap between the metering rolls 42 and 43. Monitoring means for correlating the rate of feed and/or the rate of forward movement of the coated sheet to maintain the predetermined quantity of coating material behind the metering gap may be positioned close to the metering gap. In an alternate arrangement the flow of material from the mixing head 47 can be controlled by a pressure sensing device 49 to maintain substantial constant pressure on the coating material in the loop 44.

In FIGURE 5 there is shown a sheet material 60 entering a coating zone 61 having an adjustable metering gap 62 between the portions of sheet material against rolls 63 and 64. A loop 65 is maintained by reason of a pressure difference between a plenum 66 and the zone 67 of the internal portion of the loop 65. A loop position sensing finger 68 provides a signal which regulates the pressure difference between the plenum 66 and zone 67 so that the size of the loop 65 is substantially constant. By this arrangement, a coating 69 may be applied to the sheet material 60 by feeding the coating material into the zone 67 of the loop 65 through openings in the end plates against which the sheet 60 of the loop 65 is sealed. However, if desired an appropriate applicator may be provided within the loop 65.

Figure 6:
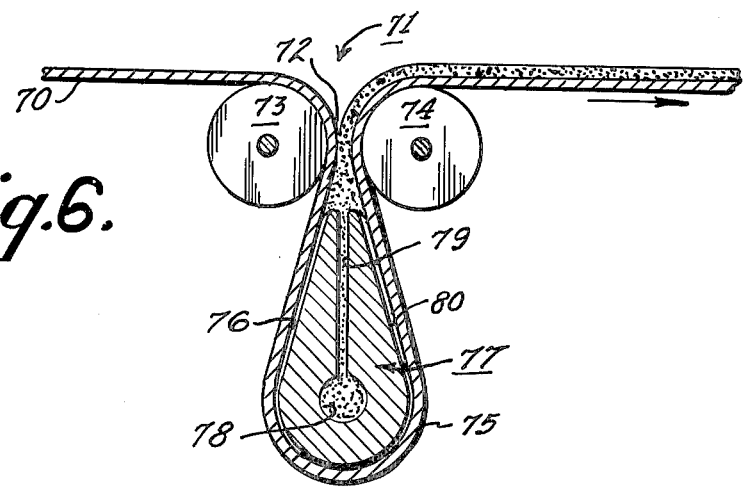
FIGURES 6 and 7 are schematic views of a second modification of the apparatus of FIGURE 2.
Figure 7:
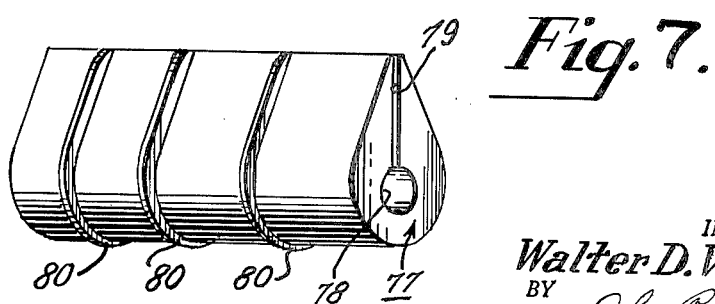

In the apparatus shown in FIGURES 6 and 7 sheet material 70 advances into a metering zone 71 which includes an adjustable metering gap 72 between the portions of the sheet material in contact with metering rolls 73 and 74. The sheet material forms a loop 75 which defines a zone 76 which is substantially filled with an applicator 77. As shown in FIGURE 7, the applicator 77 has a central feed supply line 78 and a discharge slot 79. A plurality of surface protuberances such as ribs 80 on the applicator 77 assist in lubricating the passage of the sheet around the loop and may also assist in distributing a film of uniform thickness on the sheet material as it passes around the loop 75.

In the operation of the coating method of FIGURES 6 and 7, the coating composition is pumped through the supply line 78 and slot 79 of the applicator 77 so that it forms a thin film on the sheet material 70 as the sheet material passes around the loop 75 and the exact thickness of the coating 81 on sheet material 70 is regulated by the adjustment of the metering gap 72. The possibility of stale coating composition accumulating in the metering zone 71 is substantially eliminated by reason of the progressively forward movement of the coating composition in all portions of the apparatus. The apparatus includes end closures and appropriate monitoring means so that the speed of the advancing sheet material and the rate of supply of the coating composition are correlated to maintain the desired thickness of coating.

Figure 8:
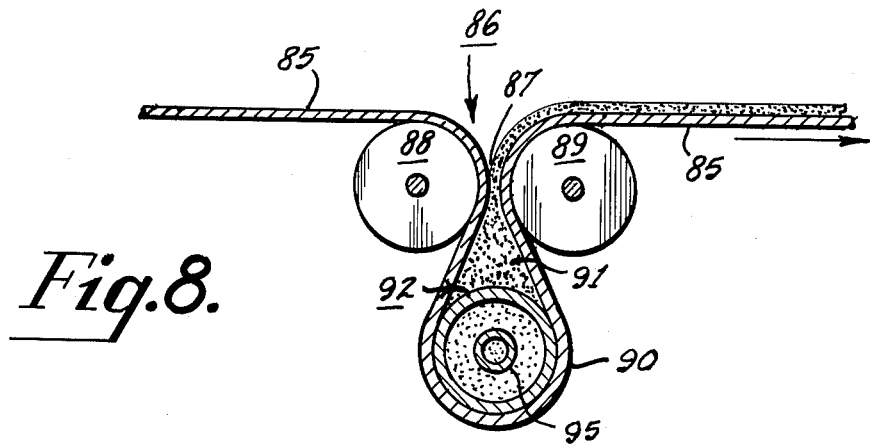
FIGURES 8 and 9 are schematic views of a preferred modification of the apparatus of FIGURE 2.
Figure 9:
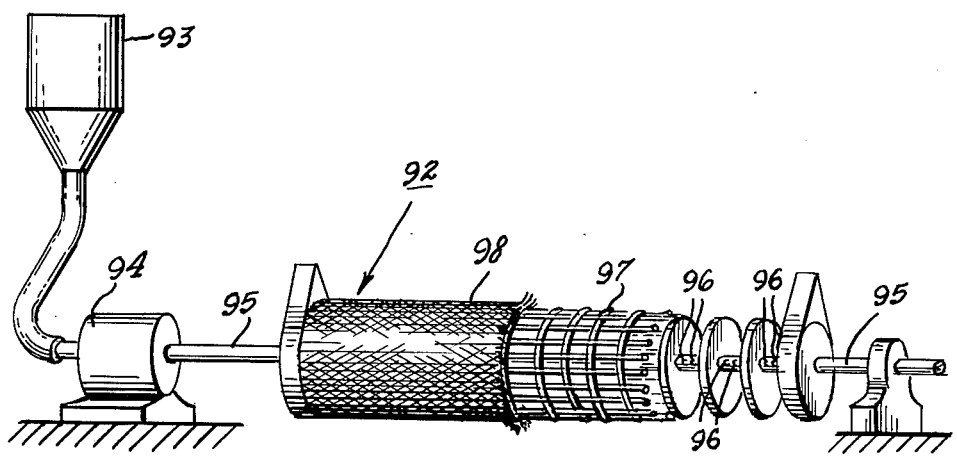

In the preferred embodiment shown in FIGURES 8 and 9, an applicator supplies the coating composition to the internal surfaces of a loop of sheet material through a rotating cylindrical screen. Sheet material 85 advances through a metering zone 86 in which an adjustable metering gap 87 is defined between the portions of the sheet material in contact with metering rolls 88 and 89. A loop 90 of the sheet material defines a zone 91 in which there is an applicator 92. Coating composition flows from a mixing head 93 through a monitoring device 94 to a central feed tube 95 of the applicator 92. The coating material flows from the central tube 95 of the applicator through openings 96 and through a coarse mesh screen 97 and a fine mesh screen 98 to that portion of the surface of the cylindrical fine mesh screen 98 which is not contacting the loop 90. In preferred embodiments, the peripheral speed of the cylindrical screen 98 is substantially the same as the peripheral speed of the sheet material 85 around the loop 90. Thus the flow of the coating composition from the mixing head 93 on to the sheet material 85 is maintained in such a manner as to eliminate the possibility of the accumulation of stale coating composition. The monitoring device 94 regulates the forward speed of the sheet material and/or the rate of supply of the coating composition so that a constant pressure is maintained in the coating composition at the metering gap 87 whereby the predetermined thickness of the coating on the sheet material 85 as it passes over the roll 89 is maintained. If the metering axis is such that coating material flows gravitationally toward gap at a rate sufficient to achieve the desired thickness of coating, the coating composition at the metering gap can be at atmospheric pressure and monitoring means can be provided to control the relative feed rates.

Various modifications of the illustrative examples of the invention are possible without departing from the scope of the appended claim.

I claim:

A method for continuously controlling thickness of plastic foaming compositions in foam laminae production which method comprises the continuously performed steps of directing an uncoated face of a sheet of material through and, thence in a path away from a metering zone, passing said sheet around a loop thence toward a coating zone, applying a foaming composition to said face advancing sheet in said coating zone and thence directing said sheet through said metering zone in the opposite direction and in facing relation to the same face; restricting with said uncoated face sheet material, the amount of said foaming composition on said coated sheet material passing through metering zone; developing signals having values representative of the monitored property of said foaming composition; and applying said signals to controllably vary the feed rate of coating material applied to said face sheet whereby accumulation of stale foaming composition preadjacent said metering zone is effectively prevented.

(References on following page)

References Cited by the Examiner

UNITED STATES PATENTS

| | | |
|---|---|---|
| 1,842,848 | 1/1932 | Steffen. |
| 2,114,618 | 4/1938 | Wallin _____ 117—68 |
| 2,292,510 | 8/1942 | Cohen et al. |
| 2,321,939 | 6/1943 | Quinn _____ 117—120 X |
| 2,513,432 | 4/1950 | Sisson _____ 117—102 X |
| 2,688,567 | 9/1954 | Franck _____ 117—64 |
| 2,841,205 | 7/1958 | Bird _____ 154—37 X |
| 2,981,638 | 4/1961 | Jones _____ 117—111 |
| 2,989,422 | 6/1961 | Helbing _____ 118—7 XR |
| 2,993,871 | 7/1961 | Shannon et al. |
| 3,037,897 | 6/1962 | Pelley _____ 156—79 X |
| 3,047,449 | 7/1962 | Coble _____ 156—79 |

FOREIGN PATENTS

| | | |
|---|---|---|
| 549,286 | 7/1956 | Belgium. |

JOSEPH B. SPENCER, *Primary Examiner.*

RICHARD D. NEVIUS, *Examiner.*